(12) United States Patent
Kaneko

(10) Patent No.: US 11,264,671 B2
(45) Date of Patent: Mar. 1, 2022

(54) BATTERY HOLDER

(71) Applicant: TOPCON Corporation, Tokyo-to (JP)

(72) Inventor: Shinsuke Kaneko, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 108 days.

(21) Appl. No.: 16/819,611

(22) Filed: Mar. 16, 2020

(65) Prior Publication Data
US 2020/0313124 A1 Oct. 1, 2020

(30) Foreign Application Priority Data

Mar. 27, 2019 (JP) .............................. JP2019-059778

(51) Int. Cl.
*H01M 50/262* (2021.01)
*H01M 50/233* (2021.01)
(Continued)

(52) U.S. Cl.
CPC ........ *H01M 50/262* (2021.01); *G01C 15/002* (2013.01); *H01M 50/233* (2021.01);
(Continued)

(58) Field of Classification Search
None
See application file for complete search history.

(56) References Cited

U.S. PATENT DOCUMENTS 5,280,273 A * 1/1994 Goldstein ............ G01N 33/004
340/632
5,626,979 A * 5/1997 Mitsui ................. H01M 50/213
429/97
(Continued)

FOREIGN PATENT DOCUMENTS

EP 2082848 A1 7/2009
EP 2605308 A1 6/2013
(Continued)

OTHER PUBLICATIONS

European communication dated Jul. 27, 2020 in co-pending European patent application No. 20165584.2.
(Continued)

*Primary Examiner* — Gregg Cantelmo
(74) *Attorney, Agent, or Firm* — Nields, Lemack & Frame, LLC

(57) ABSTRACT

In a battery holder for mounting a battery in a surveying instrument, the battery comprises contacts on a front end surface and attachment grooves formed on both side surfaces along a lower surface thereof, wherein the battery holder comprises a flange part and a battery case which extends from the flange part, wherein the battery case comprises locking pieces which are formed like a cantilever at positions corresponding to the attachment grooves on both side surfaces respectively, wherein, by fitting the battery in the battery case, the locking pieces engage with the attachment grooves through an elastic displacement, and the locking pieces hold the battery in the battery case, and wherein, by inserting the battery holder into a power supply unit storage of the surveying instrument, the locking pieces abut on a member on the power supply unit storage side, and the elastic displacement of the locking pieces is restrained.

4 Claims, 4 Drawing Sheets

(51) Int. Cl.
*H01M 50/244* (2021.01)
*H01M 50/247* (2021.01)
*G01C 15/00* (2006.01)

(52) U.S. Cl.
CPC ....... *H01M 50/244* (2021.01); *H01M 50/247* (2021.01); *H01M 2220/30* (2013.01)

(56) References Cited

U.S. PATENT DOCUMENTS

| | | | |
|---|---|---|---|
| 6,530,804 B1 * | 3/2003 | Wu | H01R 13/2442 |
| | | | 439/500 |
| 2018/0293725 A1 | 10/2018 | Ohshima | |
| 2019/0025883 A1 | 1/2019 | Alsheuski | |
| 2020/0309522 A1 | 10/2020 | Kaneko | |

FOREIGN PATENT DOCUMENTS

| | | | | |
|---|---|---|---|---|
| JP | 62002452 A | * | 1/1987 | ............ H01M 50/20 |
| JP | 3428182 B2 | | 7/2003 | |
| JP | 2006-216462 A | | 8/2006 | |
| JP | 2008257944 A | * | 10/2008 | |

OTHER PUBLICATIONS

European communication dated Jul. 28, 2020 in corresponding European patent application No. 20165587.5.
Office action dated Sep. 13, 2021 in co-pending U.S. Appl. No. 16/819,609.
Notice of allowance dated Dec. 8, 2021 in co-pending U.S. Appl. No. 16/819,609.

* cited by examiner

BATTERY HOLDER

BACKGROUND OF THE INVENTION

The present invention relates to a battery holder which enables a power supply unit to be easily attached and detached.

In order to reduce a manufacturing cost, a commonalization of components or units among different types of devices has been promoted.

In case of commonalizing the components or units, when the different types of devices are developed at the same time, a development plan including a commonalization of the components or units is carried out. Therefore, it is possible to conduct a design which enables a commonalization of shapes and mounting structures of the components or units, and the like. However, among different types of devices with different times of completion, an optimum component or unit is adopted in accordance with each device, the commonalization of the components or units can be difficult in some cases.

For example, a performance of each battery used in a power supply unit is advancing day by day, and a downsizing is achieved together with an improvement in the performance of the battery, and a shape of the battery also changes.

Therefore, it is difficult to co realize the battery or the power supply unit including conventional devices.

SUMMARY OF THE INVENTION

It is an object of the present invention to provide a battery holder which enables to commonalize batteries among different types of devices.

To attain the object as described above, in a battery holder according to the present invention for mounting a battery in a surveying instrument, the battery comprises contacts on a front end surface and attachment grooves formed on both side surfaces along a lower surface thereof, wherein the battery holder comprises a flange part and a battery case which extends from the flange part, wherein the battery case comprises locking pieces which are formed like a cantilever at positions corresponding to the attachment grooves on both side surfaces respectively, wherein, by fitting the battery in the battery case, the locking pieces engage with the attachment grooves through an elastic displacement, and the locking pieces hold the battery in the battery case, and wherein, by inserting the battery holder into a power supply unit storage of the surveying instrument, the locking pieces abut on a member on the power supply unit storage side, and the elastic displacement of the locking pieces is restrained.

Further, in the battery holder according to a preferred embodiment, the battery case has a rectangular parallelepiped shape of which upper side is opened, and in the battery case, a lower side of a front end portion of the battery case is removed over the full width in such a manner that an opening portion from which the contacts are exposed, wherein the battery is mounted in the battery case from above, the battery holder having the battery mounted thereon is inserted into the power supply unit storage from a horizontal direction, and the battery is mounted in the surveying instrument, and wherein the contacts are connected with contacts on the surveying instrument side.

Further, in the battery holder according to a preferred embodiment, a lock module is provided on the flange part, wherein the lock module comprises a lock knob and a lock plate which rotates together with the lock knob, wherein the lock plate comprises engagement holes at both end portions thereof, and wherein, by inserting the battery holder into the power supply unit storage, the lock pins provided to the power supply unit storage are fitted in the engagement holes, and by rotating the lock knob, the engagement holes engage with the lock pins.

Furthermore, in the battery holder according to a preferred embodiment, inner surface protrusions which are fitted in the attachment grooves are formed on an inner surface of each of the locking pieces, and outer surface protrusions capable of abutting on an inner wall of the power supply unit storage are formed on an outer surface of each of the locking pieces.

According to the present invention, in the battery holder for mounting the battery in the surveying instrument, the battery comprises contacts on a front end surface and attachment grooves formed on both side surfaces along a lower surface thereof, wherein the battery holder comprises a flange part and a battery case which extends from the flange part, wherein the battery case comprises locking pieces which are formed like a cantilever at positions corresponding to the attachment grooves on both side surfaces respectively, wherein, by fitting the battery in the battery case, the locking pieces engage with the attachment grooves through an elastic displacement, and the locking pieces hold the battery in the battery case, and wherein, by inserting the battery holder into a power supply unit storage of the surveying instrument, the locking pieces abut on a member on the power supply unit storage side, and the elastic displacement of the locking pieces is restrained. As a result, a battery with a different mounting structure can be mounted in a surveying instrument via the battery holder, and it is possible to commonalize the batteries among the different types of devices.

DETAILED DESCRIPTION OF THE PREFERRED EMBODIMENT

A description will be given below on an embodiment of the present invention by referring to the attached drawings.

A description will be given on an outline of the present embodiment by referring to FIG. 1. In the present embodiment, as an example of a surveying instrument, a pipe laser used in case of installing a pipe is shown.

Figure 1:
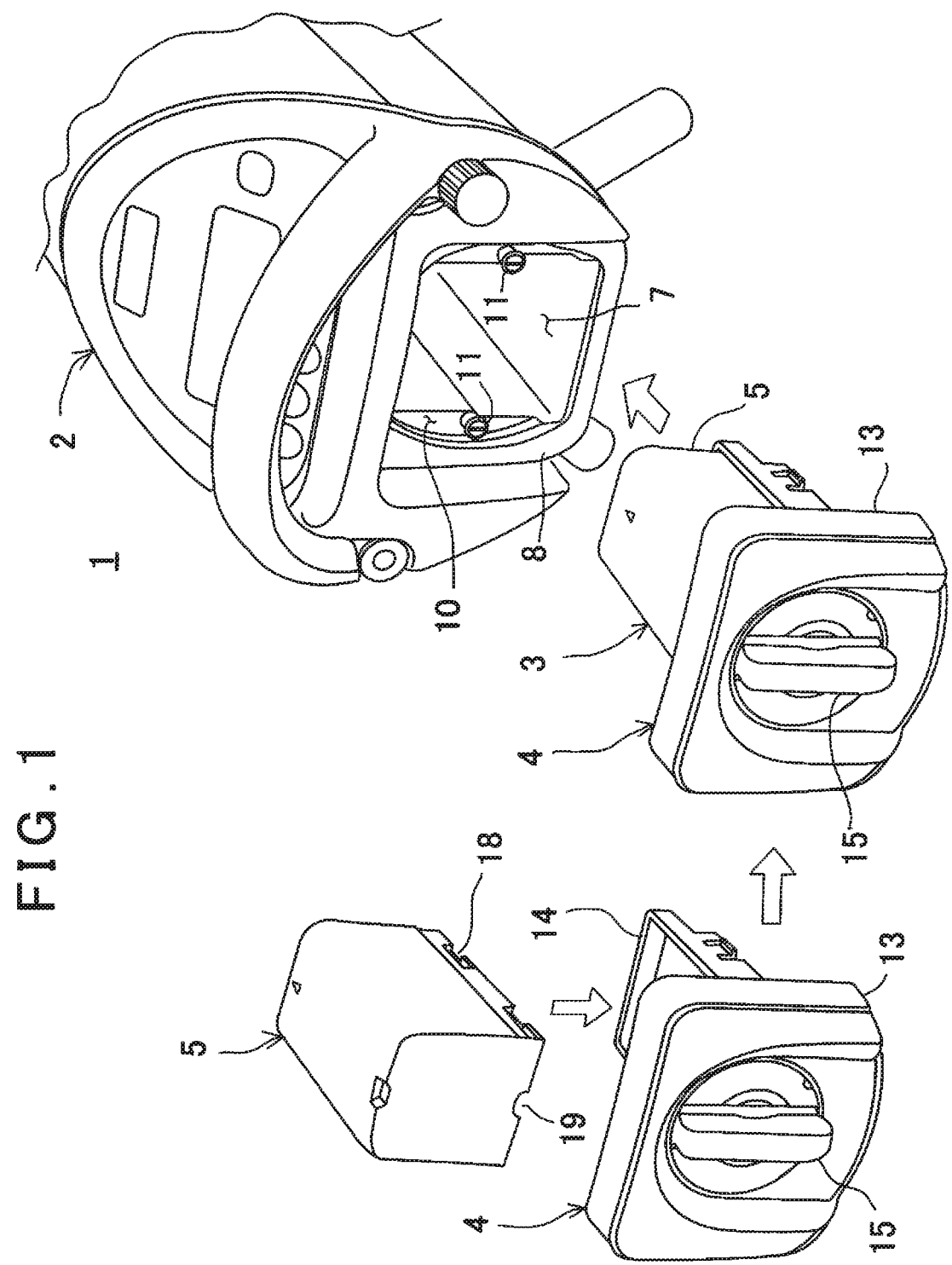
FIG. 1 is an overall perspective view of an embodiment according to the present invention.

FIG. 1 is a perspective view of a surveying instrument 1 as viewed from the rear, and in FIG. 1, a reference numeral 2 denotes a surveying instrument main body, a reference numeral 3 denotes a power supply unit, a reference numeral 4 denotes a battery holder, and a reference numeral 5 denotes a battery.

The power supply unit 3 is attached and detached with respect to the surveying instrument main body 2 from the rear.

The surveying instrument main body 2 has a power supply unit storage 7 which is opened to the rear. An abutting surface 8 receding inward from a rear end surface of the surveying instrument main body 2 is formed around an opening of the power supply unit storage 7.

Lock pins 11 are protruded at two positions (left-and-right two positions in the drawing) interposing the opening therebetween on a flange surface 10 receding inward from the abutting surface 8.

The power supply unit 3 is made up by the battery holder 4 and the battery 5, and the battery 5 is mounted on the battery holder 4 from above.

The battery holder 4 consists of a flange part 13 and a battery case 14 which extends frontward. A shallow bottom concave portion is formed to the battery case 14, and the battery 5 is fitted in the concave portion from above. Electric contacts (to be described later) are formed on a front surface (in the drawing, a front end surface on the surveying instrument main body 2 side) of the battery 5.

The flange part 13 abuts on the abutting surface 8 in such a manner that a receding part of the abutting surface 8 is filled. Further, the flange part 13 has a lid 12 which closes the opening of the power supply unit storage 7. The lid 12 is provided with a seal 9, and the seal 9 can abut on a rim of the opening. It is to be noted that the seal 9 may be provided on the abutting surface 8 side.

Further, a lock module 16 (see FIG. 2) is provided on the flange part 13. The lock module 16 has a lock knob 15 and a lock plate 21 (see FIG. 2). The lock knob 15 is only rotatably held in the flange part 13 without a displacement in an axial direction. The lock plate 21 has, at both end portions thereof, engagement holes 22 which engage with the lock pins 11, and the lock plate 21 is rotated by the lock knob 15.

When the power supply unit 3 is mounted in the power supply unit storage 7, and the electric contacts of the battery 5 are joined with electric contacts on the surveying instrument main body 2 side in a completely mounted state. In a state where the power supply unit 3 is mounted, when the lock knob 15 is rotated, the lock plate 21 engages with the lock pins 11. Thereby, the power supply unit 3 is fastened to the surveying instrument main body 2, and the opening is liquid-tightly sealed.

First, a description will be given on the battery 5 used in the present embodiment by referring to FIG. 2 and FIG. 3. It is to be noted that, in FIG. 2, the left is determined to be the rear, and the right is determined to be the front.

The battery 5 has a rectangular parallelepiped shape, and the battery 5 is a general-purpose battery which is used in different types of devices.

Contacts 17 are provided on a front surface lower portion of the battery 5. When the contacts 17 are pressed against contacts on the other side, the contacts are brought into contact with each other.

At lower ends on both side surfaces of the battery 5, attachment grooves 18 adapted to attach the battery 5 are formed at four positions in total, which are two positions on the front and two positions on the rear. Further, a concave portion 19 for positioning is formed at a rear surface lower end of the battery 5.

Each attachment groove 18 has an overturned L-shape. Each attachment groove 18 is made up by a horizontal groove portion 18*a* which is parallel to a bottom surface and a vertical groove portion 18*b* which is continuous with the horizontal groove portion 18*a* at a right angle and opened on a lower surface.

A description will be given on a normal mounting method which the battery 5 itself has. Protrusions (not shown) are provided on a device side in which the battery 5 is mounted, the battery 5 is installed from above in such a manner that the protrusions enter the vertical groove portions 18*b*, then the battery 5 is slid in a horizontal direction, and the protrusions are fitted in the horizontal groove portions 18*a* respectively. Thereby, the battery 5 is held in the device, and the contacts 17 come into contact with the contacts on the other side.

On the other hand, in the present embodiment, the battery 5 is held with the use of the horizontal groove portions 18*a* only.

A description will be given on the battery case 14.

The battery case 14 is made of a synthetic resin, and has approximately a shallow bottom and rectangular parallelepiped shape whose upper side is opened. Further, in the battery case 14, a lower side of a front end portion of the battery case 14 is removed over the full width in such a manner that an opening portion 23 is formed.

A convex portion 24 which is fitted in the concave portion 19 is formed at the center of a bottom surface rear end portion of the battery case 14.

Further, locking pieces 25 are provided at two positions on the front and rear sides of each sidewall 14*a* of the battery case 14.

Figure 4:
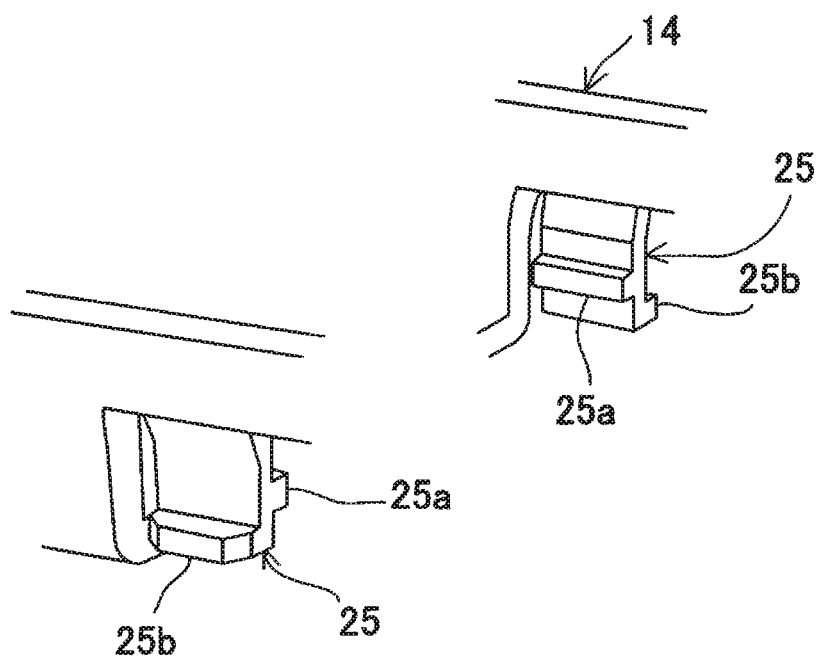
FIG. 4 is a partial perspective view of a battery case to show locking pieces.

As shown in FIG. 4, each locking piece 25 is formed like a cantilever. An inner surface protrusion 25*a* is protruded on an inner surface of the locking piece 25, and an outer surface protrusion 25*b* is protruded on an outer surface of the locking piece 25.

A tip portion of the locking piece 25 can be elastically displaced by an elasticity which a material of the battery case 14 has. Further, an elastic displacement amount corresponding to at least a protruding amount of the inner surface protrusion 25*a* is assured.

Figure 2:
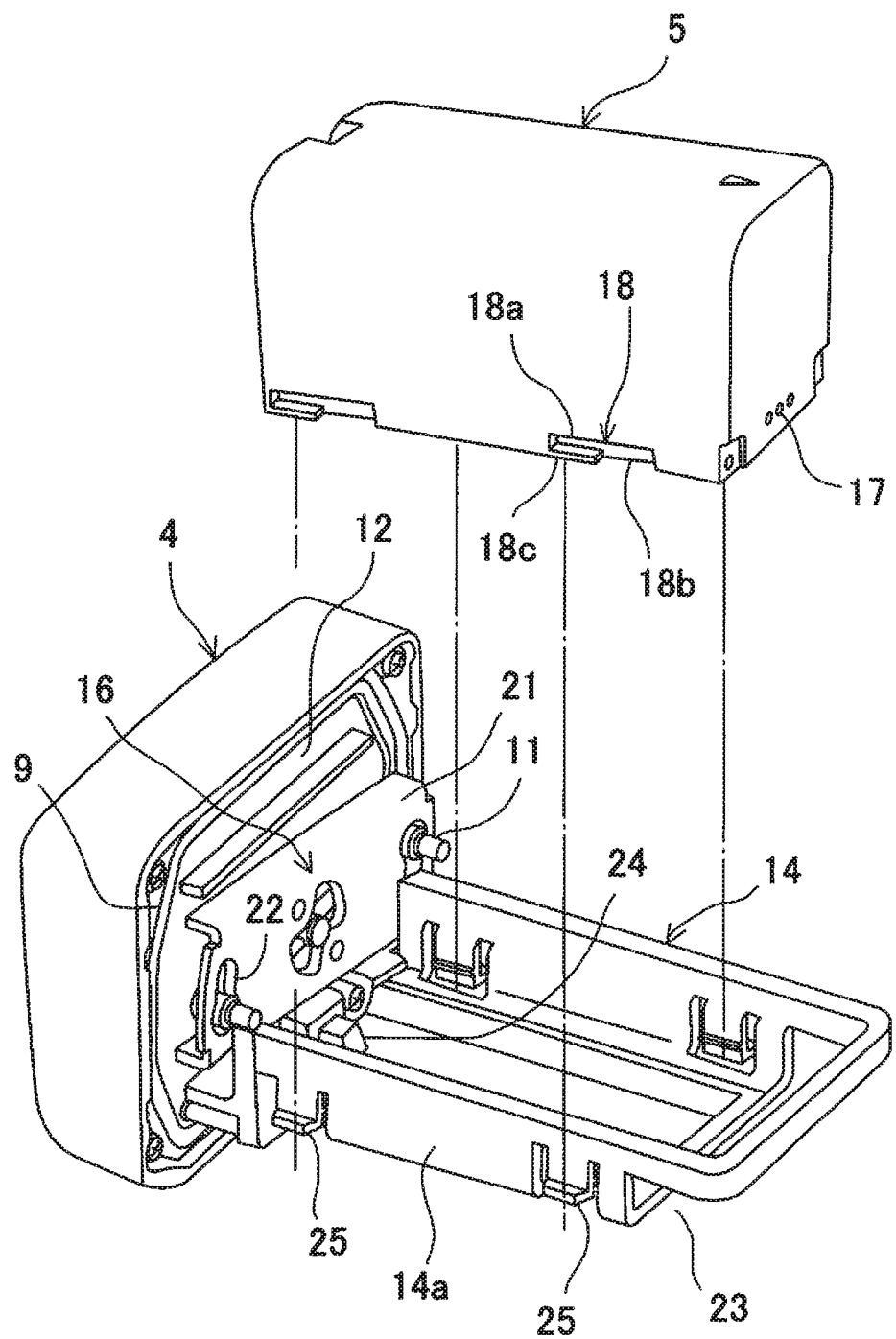
FIG. 2 is a perspective view to show a relationship between a battery holder according to the present embodiment and a battery.
Figure 3:
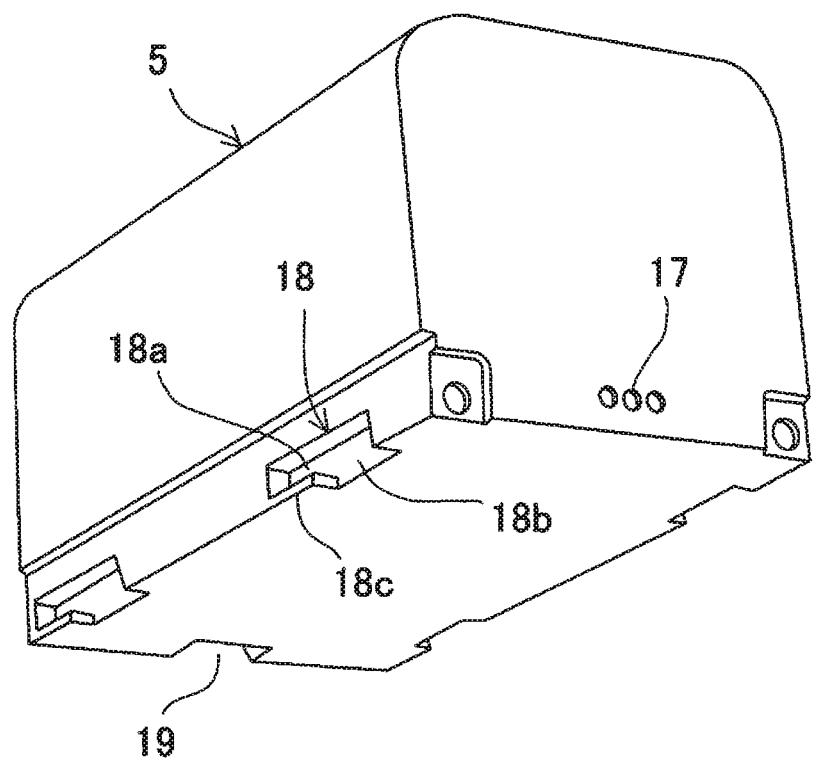
FIG. 3 is a perspective view to show the battery as viewed from below.

A position of each locking piece 25 in a front-and-rear direction corresponds to each horizontal groove portion 18*a* as shown in FIG. 2.

When the battery 5 is fitted in the battery case 14 from above, each inner surface protrusion 25*a* gets over a bank 18*c* of each horizontal grove portion 18*a*, is fitted in the horizontal groove portion 18*a*, and holds the battery 5. At the same time, the convex portion 24 is fitted in the concave portion 19, and the battery 5 is held in the battery case 14, that is, the battery holder and is positioned with respect to the battery holder 4. Further, in case of removing the battery 5, by applying an upward force for the battery 5 to the battery holder 4, each locking piece 25 is elastically displaced. Thereby, each inner surface protrusion 25*a* comes off each horizontal groove portion 18*a* in such a manner that the battery 5 can be removed. That is, the battery 5 can be easily attached and detached with respect to the battery holder 4 from above.

Figure 5:
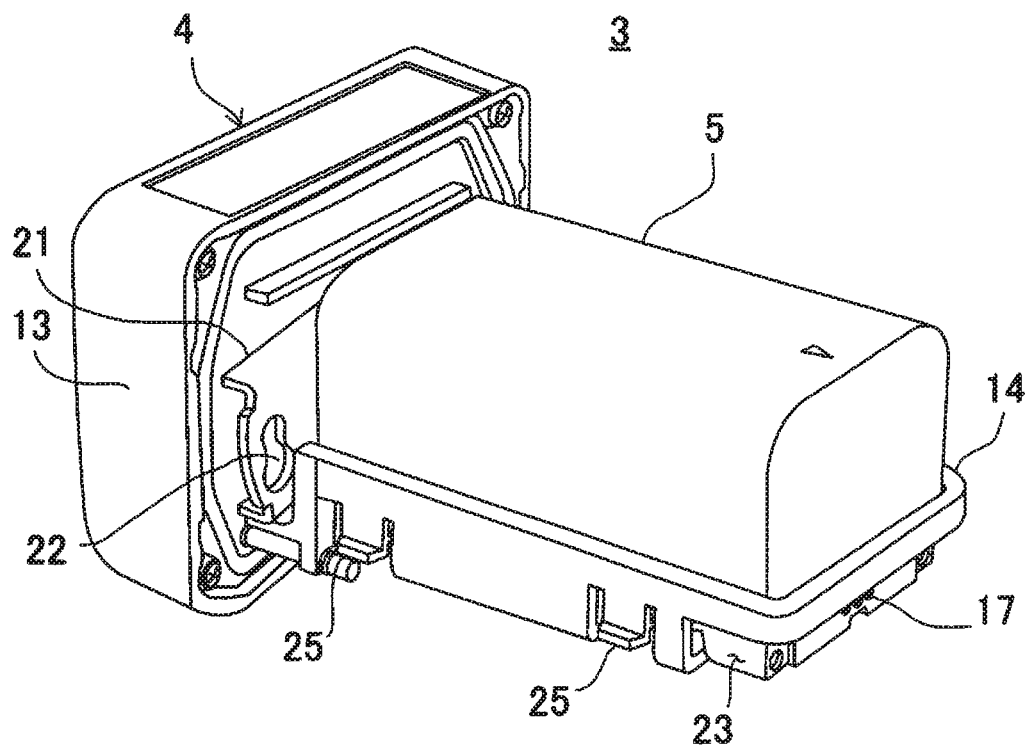
FIG. 5 is a perspective view of a state where the battery is mounted on the battery holder as viewed from the front and above.
Figure 6:
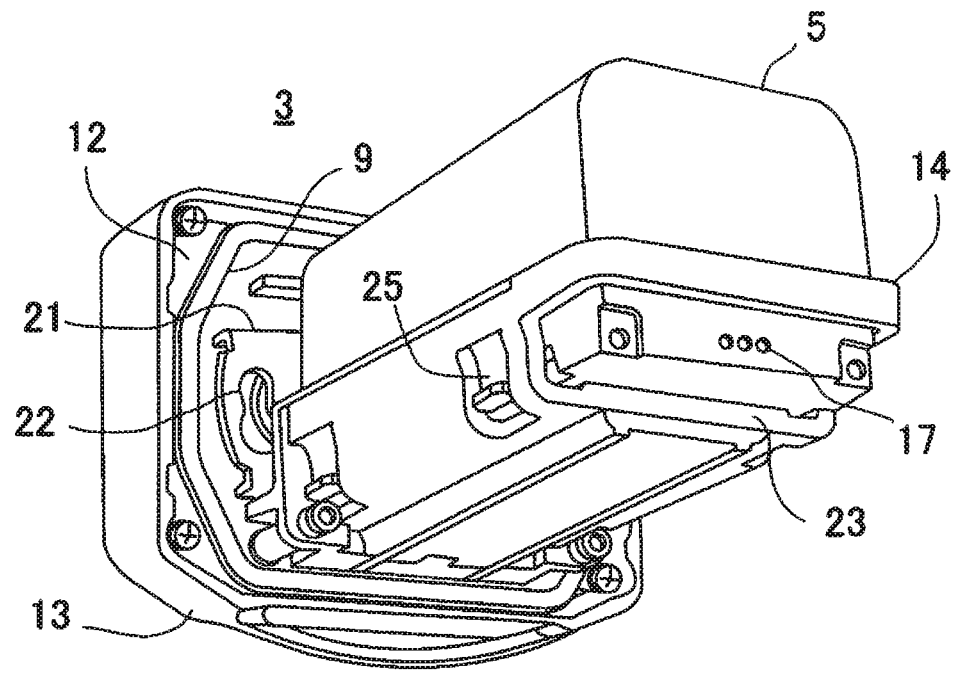
FIG. 6 is a perspective view of the state where the battery is mounted on the battery holder as viewed from the front and below.

FIG. 5 and FIG. 6 show a state where the battery 5 is mounted on the battery holder 4.

In a state where the battery 5 is mounted on the battery holder 4, the contacts 17 are exposed from the opening portion 23. The battery holder 4 having the battery 5 mounted thereon is unitized and can be treated as the power supply unit 3.

In case of mounting the power supply unit 3 in the surveying instrument main body 2, the power supply unit 3 is mounted in the power supply unit storage 7 from the horizontal direction. When the power supply unit 3 is mounted in the power supply unit storage 7, the outer surface protrusions 25b abut on a member, for example, an inner wall, on the power supply unit storage 7 side, and the elastic displacement of the locking pieces 25 is suppressed. That is, a displacement of the inner surface protrusions 25a in a direction to deviate from the horizontal groove portions 18a is restrained. The locking pieces 25 assuredly firmly hold the battery 5 by engaging the inner surface protrusions 25a and the horizontal groove portions 18a.

When the power supply unit 3 is completely mounted in the power supply unit storage 7, the contacts 17 come into contact with the contacts on the surveying instrument main body 2 side, and the electric power can be supplied from the battery 5 to the surveying instrument main body 2.

Further, the lock pins 11 are fitted in the engagement holes 22, by rotating the lock knob 15, the lock plate 21 is rotated, and the engagement holes 22 engage with the lock pins 11. The power supply unit 3 is fastened to the surveying instrument main body 2, and the power supply unit 3 and the surveying instrument main body 2 are sealed by the seal 9.

It is to be noted that various kinds of engagements of the engagement holes 22 and the lock pins 11 can be considered. As an example, each lock pin 11 is a two-stepped pin with a large-diameter head portion and a small-diameter base portion, and each engagement hole 22 is formed into a snowman-like shape with a large-diameter portion and a small-diameter portion which is continuous with the large-diameter portion. In this case, in a state where the head portions of the lock pins 11 are inserted in the large-diameter portions of the engagement holes 22 respectively, when the lock plate 21 is rotated and the base portions are fitted in the small-diameter portions of the engagement holes 22 respectively, a locked state can be achieved, for example.

According to the present embodiment, the battery 5 can be easily attached and detached with respect to the battery holder 4 by one operation from above, and the power supply unit 3 unitized by the battery 5 and the battery holder 4 can be easily mounted and removed with respect to the surveying instrument main body 2 by one operation from the horizontal direction. Therefore, the battery 5 can be mounted in the surveying instrument 1 irrespective of a mounting structure or a mounting method which the battery 5 itself has, and a commonalization of the battery 5 can be archived.

It is to be noted that, in the embodiment as described above, a description has been given on a case where the battery 5 has the L-shaped attachment grooves 18 on the side surfaces thereof, but the present embodiment can be applied as long as the battery 5 has groove portions formed along a lower surface thereof without being restricted to the L-like shape.

Further, it suffices that the displacement of the locking pieces 25 is restrained by the wall surface of the power supply unit storage 7 or a member provided to the power supply unit storage 7 in a state where the battery holder 4 is mounted in the power supply unit storage 7. Therefore, the outer surface protrusions 25b may be omitted.

The invention claimed is:

1. A power supply unit for use in a surveying instrument, comprising a battery and a battery holder, wherein said battery comprises contacts on a front end surface and attachment grooves formed on both side surfaces along a lower surface thereof, wherein said battery holder comprises a flange part and a battery case which extends from said flange part, wherein said battery case comprises locking pieces which are formed as a cantilever at positions corresponding to said attachment grooves on both side surfaces respectively, wherein, by fitting said battery in said battery case, said locking pieces engage with said attachment grooves through an elastic displacement, and said locking pieces hold said battery in said battery case, and wherein, by inserting said battery holder into a power supply unit storage of said surveying instrument, said locking pieces abut on a member on a side of said power supply unit storage, and the elastic displacement of said locking pieces is restrained.

2. The power supply unit according to claim 1, wherein said battery case has a rectangular parallelepiped shape of which upper side is opened, and in said battery case, a lower side of a front end portion of said battery case is removed over the full width in such a manner that an opening portion from which said contacts are exposed, wherein said battery is mounted in said battery case from above, said battery holder having said battery mounted thereon is inserted into said power supply unit storage from a horizontal direction, and said battery is mounted in said surveying instrument, and wherein said contacts are connected with contacts on said surveying instrument side.

3. The power supply unit according to claim 1, wherein a lock module is provided on said flange part, wherein said lock module comprises a lock knob and a lock plate which rotates together with said lock knob, wherein said lock plate comprises engagement holes at both end portions thereof, and wherein, by inserting said battery holder into said power supply unit storage, lock pins provided to said power supply unit storage are fitted in said engagement holes, and by rotating said lock knob, said engagement holes engage with said lock pins.

4. The power supply unit according to claim 1, wherein inner surface protrusions which are fitted in said attachment grooves are formed on an inner surface of each of said locking pieces, and outer surface protrusions capable of abutting on an inner wall of said power supply unit storage are formed on an outer surface of each of said locking pieces.

* * * * *